United States Patent [19]

Tsay

[11] Patent Number: 5,286,121
[45] Date of Patent: Feb. 15, 1994

[54] AUTOMATIC DEVICE FOR MAKING FLOUR STRAP

[76] Inventor: Shih-Chu Tsay, No. 62, Lane 313, Wen-Hsien Rd., Tainan, Taiwan

[21] Appl. No.: 50,634

[22] Filed: Apr. 22, 1993

[51] Int. Cl.⁵ .................................................. A21C 1/08
[52] U.S. Cl. ........................................ 366/72; 99/353; 99/484; 366/76; 366/156; 366/168; 366/177; 366/186
[58] Field of Search ............... 99/353, 494, 484, 450.1, 99/450.2; 366/76, 91, 93, 97, 71–73, 131–134, 154–156, 167, 168, 173, 177, 180, 186, 182, 192, 193, 290

[56] References Cited

U.S. PATENT DOCUMENTS

| | | | |
|---|---|---|---|
| 773,380 | 10/1904 | Euler | 366/72 |
| 1,134,173 | 4/1915 | Welton et al. | 366/72 |
| 1,302,053 | 4/1919 | Jameson | 366/72 |
| 3,245,361 | 4/1966 | Enoch et al. | 366/192 |
| 3,383,096 | 5/1968 | Braibanti et al. | 366/91 |
| 3,840,213 | 10/1974 | Kormos | 366/290 X |
| 3,960,368 | 6/1976 | Kishimoto | 366/91 X |
| 4,501,499 | 2/1985 | Boan et al. | 366/156 |
| 4,580,903 | 4/1986 | Ihler et al. | 366/76 |
| 4,683,813 | 8/1987 | Schultz | 99/353 |
| 4,881,819 | 11/1989 | Blees | 366/177 X |

FOREIGN PATENT DOCUMENTS 2501941  7/1975  Fed. Rep. of Germany ........ 366/72

Primary Examiner—Timothy F. Simone
Attorney, Agent, or Firm—Jacobson, Price, Holman & Stern

[57] ABSTRACT

An automatic device for making a flour strap comprises a mixing container communicating respectively with a flour container, a liquid container and a rolling container. The flour contained in the flour container and the liquid contained in the liquid container are introduced into the mixing container in which the flour and the liquid are mixed thoroughly to form a flour dough. The mixing container is in communication with the rolling container by means of an inlet through which the flour dough is transferred from the mixing container to the rolling container in which the flour dough is rolled and pressed repeatedly to become a flour strap, which is then carried away by a conveyor located under the rolling container.

6 Claims, 3 Drawing Sheets

AUTOMATIC DEVICE FOR MAKING FLOUR STRAP

FIELD OF THE INVENTION

The present invention relates to an automatic device for preparing food, and more particularly to an automatic device for making flour straps for baking into bread, pastry, etc.

BACKGROUND OF THE INVENTION

The prior art automatic device for making flour straps is not an automatic device in a sense that it is not capable of making a flour dough by mixing flour, liquid and other ingredients. In other words, the flour dough must be made separately and then manually introduced into the device in which the flour dough is pressed and rolled to become flour straps of various sizes.

SUMMARY OF THE INVENTION

It is therefore the primary objective of the present invention to provide an automatic device for making flour straps with means capable of mixing flour, liquid and other ingredients to form a flour dough, which is then pressed and rolled repeatedly to become a flour strap.

In keeping with the principles of the present invention, the foregoing objective of the present invention is accomplished by an automatic device for making a flour strap, which comprises a flour container in communication with a mixing container in which flour, liquid and other ingredients are mixed thoroughly to form a flour dough, which is then allowed to drop into a rotatable rolling container. The rotating action of the rolling container causes the flour dough to be pressed and rolled repeatedly by the rolling wheels so as to become the flour strap, which is then carried away by a conveyor.

The foregoing objective, structure and function of the present invention can be better understood by studying the following detailed description of a preferred embodiment of the present invention in conjunction with the accompanying drawings.

DETAILED DESCRIPTION OF THE INVENTION

Figure 1:
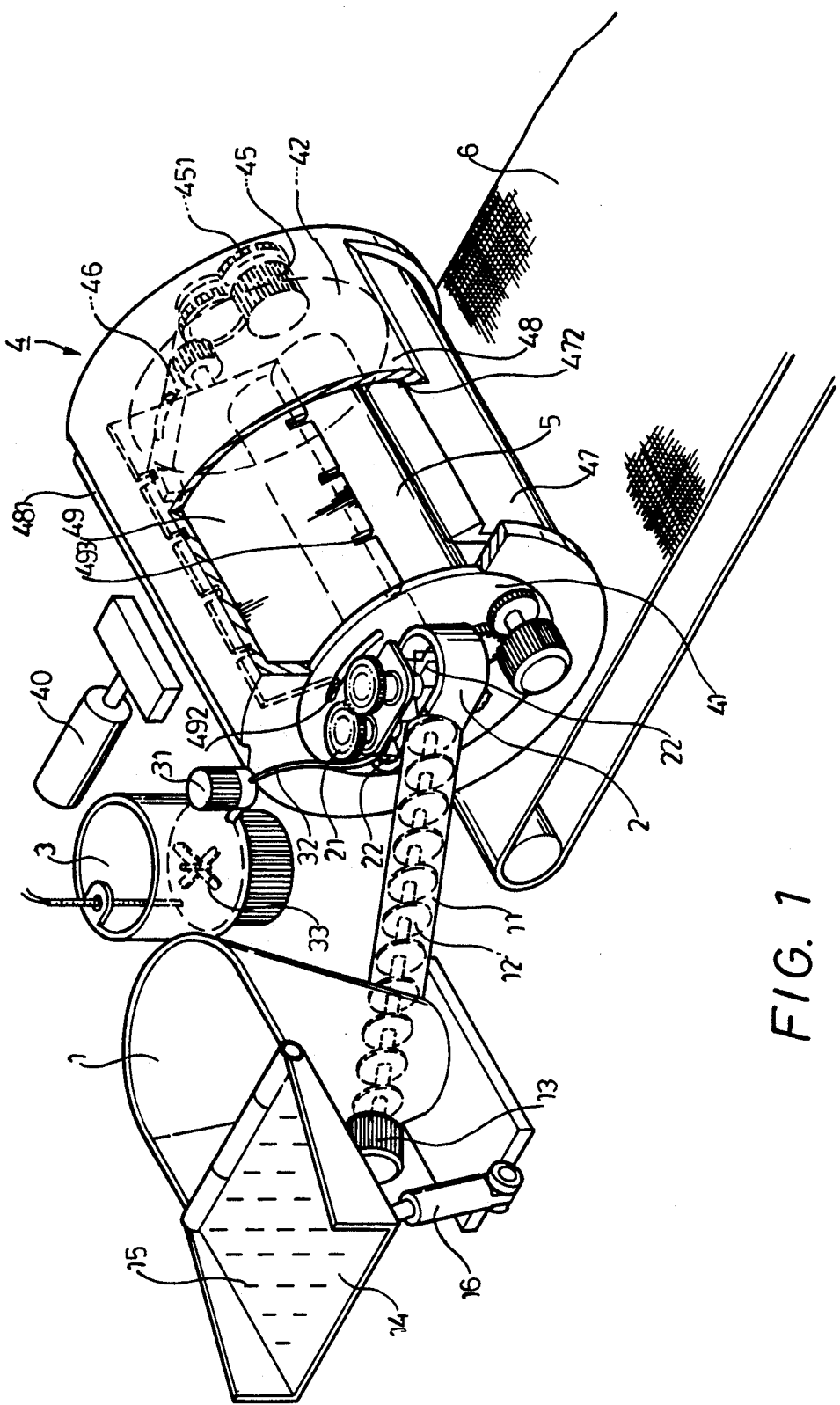
FIG. 1 shows a perspective view of the present invention.

Referring to FIG. 1, an automatic device for making a flour strap of the present invention is shown comprising a flour container 1, a mixing container 2, a liquid container 3, a rolling container 4, a rolling wheel set 5, and a conveyor 6.

The flour container 1 of bulky construction is provided at the bottom portion thereof with a forwarding pipe 11 having therein a driving rod 12 which is driven by a power member 13. The flour in the flour container 1 is transported via the forwarding pipe 11 to the mixing container 2. The flour container 1 is provided with a platform 14 on which a whole bag of flour can be placed. The platform 14 is provided on the surface thereof with a plurality of needlelike projections 15 serving to ensure that the flour bag is held securely on the platform 14. In addition, the platform 14 is pivoted by means of a shaft at the inner end of the platform 14 to the flour container 1, and the platform 14 is sustained at the outer end thereof by a cylinder 16 such that the platform 14 can be raised by the cylinder 16 to facilitate the unloading of the flour contained in the bag which is held on the platform 14.

The mixing container 2 is in communication with the flour container 1 by means of the forwarding pipe 11 and with the liquid container 3. The mixing of the flour and the liquid is brought about by the rotating action of the mixing wheels 22 driven by the gears 21. The mixture of the flour and the liquid is then transferred to the rolling container 4 via an inlet 43.

The liquid container 3 is provided with a pump 31 by which the liquid in the liquid container 3 is forced into the mixing container 2 via a liquid tube 32. The liquid container 3 may contain a mixture of water and other ingredients such as leavening agent, fruit and vegetable juices, etc. The water and the other ingredients are thoroughly mixed by means of an impeller 33 mounted inside the liquid container 3. The liquid in an atomized form is injected into the mixing container 2.

Figure 2:
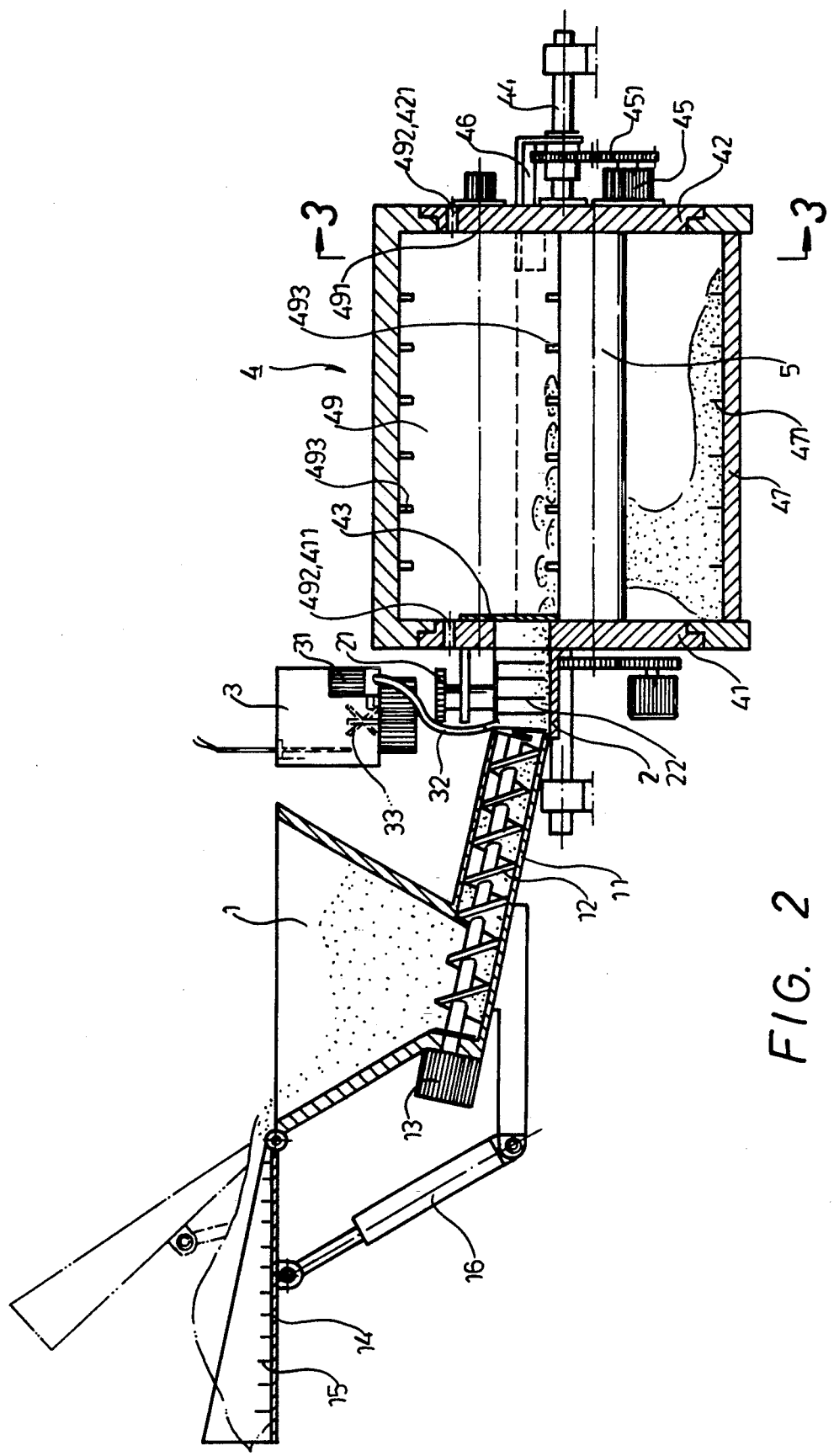
FIG. 2 shows a front elevational view of the present invention.

As shown in FIGS. 1 and 2, the rolling container 4 is provided with the two stationary side walls 41 and 42, with the side wall 41 being fastened with the mixing container 2. The rolling container 4 is in communication with the mixing container 2 via the inlet 43 of the side wall 41. The opening and the closing of the inlet 43 can be so regulated that the inlet 43 can be opened at the time when the process of making the flour dough is completed in the mixing container 2, so as to allow the flour dough to be transferred to the rolling container 4. The side wall 42 is braced by a main shaft 44, which can be driven to rotate by a gear 451 which in turn is driven by a power member 45. The rolling container 4 is further provided with an eccentric rod 46, which can be driven to rotate synchronously along with the main shaft 44 and which is fastened at one end thereof with a main housing 47 of the rolling container 4 such that the eccentric rod 46 can trigger the turning of the rolling container 4. It must be noted that the rolling container 4 comprises another main housing 48. The housings 47 and 48 are semicircular in their cross sections and are corresponding in dimension to each other. These two semicircular housings 47 and 48 form the main body of the rolling container 4, which is circular in its cross section.

Figure 3:
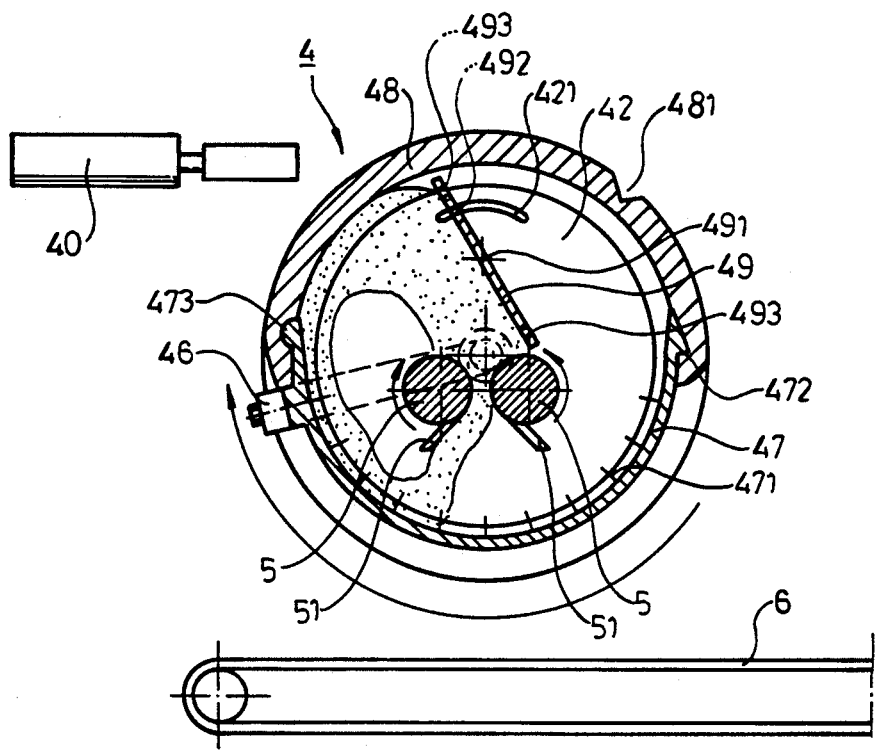
FIG. 3 shows a sectional view of a portion taken along the line 3—3 as shown in FIG. 2.

As shown in FIG. 3, the housing 47 is provided on the inner wall thereof with a plurality of upright protuberances 471 which are intended for use in holding the flour dough when the rolling container 4 is caused to rotate. When the housing 47 is activated by the eccentric rod 46 to turn in a clockwise direction, the housing 48 can be also activated to turn by virtue of the fact that the housings 47 and 48 engage by means of a hook 472 and a retaining projection 473 of semicircular construction. The housing 47 is able to carry the flour dough to the highest point by means of the upright protuberances 471. The flour dough at the highest point is caused by a baffle 49 to fall so as to land between the two rolling wheel sets 5. As a result, the flour dough can be rolled and pressed repeatedly in the rolling container 4.

Figure 4:
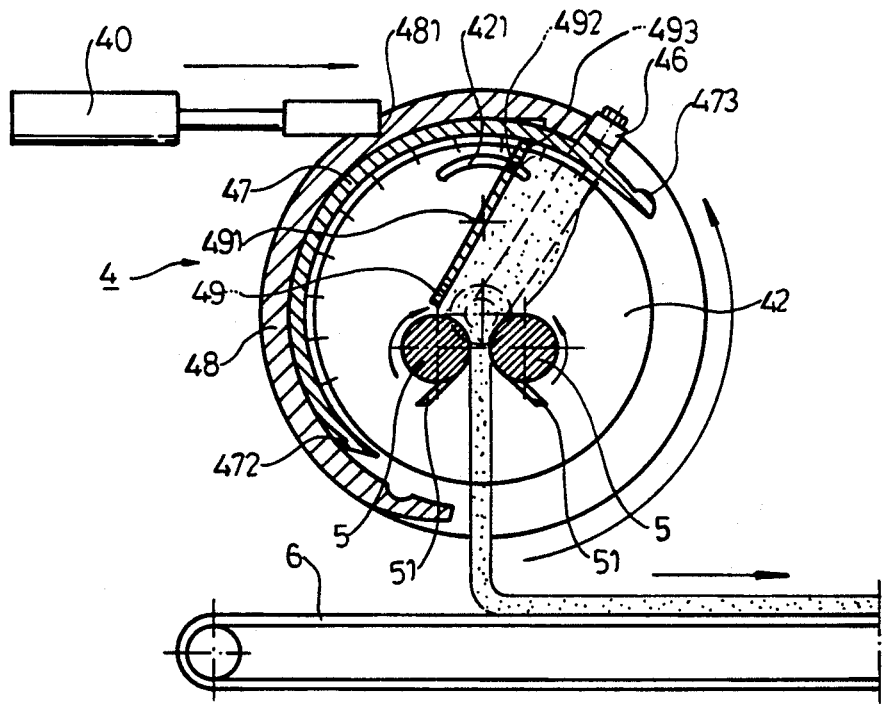
FIG. 4 shows a schematic view of the portion of the present invention which is shown in FIG. 3 and which is in action.

Now referring to FIG. 4, the eccentric rod 46 is shown to rotate in a counterclockwise direction, thereby causing the hook 472 and the retaining projection 473 to remain apart. In the meantime, the rotating action of the housing 48 is obstructed by an arm of a cylinder 40, which is lodged in a notch 481 of the housing 48. The flour strap so made is then allowed to move out of the rolling container 4 via a gap formed between the housings 47 and 48, so as to be carried away by the conveyor 6.

As shown in FIGS. 1, 2 and 3, the baffle 49 is designed to turn on a center point 491 serving as a fulcrum. In addition, the baffle 49 is provided with a connection rod 492, which extends outwards through a slot 421 of the side wall 42 in such a manner that the baffle 49 prevents the flour dough from being carried continuously by the housing 47 so as to ensure that the flour dough is caused to fall in order to land between the two rolling wheel sets 5. As shown in FIG. 3, the baffle 49 is provided with a hole 493 so dimensioned as to permit the upright protuberances 471 of the housing 47 to pass therethrough.

Referring to FIGS. 2 and 3, the rolling wheel set 5 is shown to be mounted rotatably at both ends thereof to the side walls 41 and 42. Located over the rolling wheel sets 5 is the baffle 49, which causes the flour dough to fall and land between the two rolling wheel sets 5 so that the flour dough is rolled and pressed repeatedly by the rolling wheel sets 5 to become the flour strap. As shown in FIG. 3, each of the two rolling wheel sets 5 is provided with a scraping plate 51, which works to prevent the flour strap from sticking to the rolling wheel sets 5 and which works to make sure that the flour strap is caused to fall to land on the protuberances 471 of the housing 47 or on the conveyor 6.

As described previously, the flour contained in the flour container 1 and the liquid contained in the liquid container 3 are introduced automatically into the mixing container 2 in which the flour and the liquid are mixed to form the flour dough, which is subsequently transferred via the inlet 43 to the rolling container 4. The flour dough is rolled and pressed repeatedly by the rolling wheel sets 5 in the rolling container 4 so as to form the flour strap. When the flour strap is rolled and pressed for a predetermined number of times, the rolling container 4 is then caused by the eccentric rod 46 to rotate in reverse. In addition, the housing 48 of the rolling container 4 is caused to stop turning by the cylinder 40 which is lodged in the notch 481 of the housing 48. In the meantime, the baffle 49 rotates to cause the flour strap so made in the rolling container 4 to be so removed as to land on the conveyor 6, which transports the flour strap to a place where the flour strap is baked into bread, pastry, and so forth.

The embodiment of the present invention described above is to be regarded in all respects as merely illustrative and not restrictive. Accordingly, the present invention may be embodied in other specific forms without deviating from the spirit thereof. The present invention is therefore to be limited only by the scope of the following appended claims.

What is claimed is:

1. An automatic device for making a flour strap comprising:
    a flour container provided with a forwarding pipe fastened thereto;
    a liquid container provided with a liquid tube fastened thereto;
    a mixing container communicating respectively with said flour container through said forwarding pipe and with said liquid container through said liquid tube;
    a rolling container having a rotatable body and two stationary side walls opposite to each other, with one of said two stationary side walls being provided with an inlet through which said rolling container communicates with said mixing container, said rolling container further having a baffle mounted therein and two rolling wheel sets mounted therein; and
    a conveyor located under said rolling container.

2. The automatic device for making a flour strap according to claim 1 wherein said forwarding pipe is fastened at one end thereof to a lower portion of said flour container such that a grain flour contained in said flour container is moved efficiently to said mixing container.

3. The automatic device for making a flour strap according to claim 1 wherein said flour container is provided with a platform having one end that is pivoted to said flour container and having another end that is sustained by a cylinder and further having an upper surface provided thereon with a plurality of needlelike projections.

4. The automatic device for making a flour strap according to claim 1 wherein said rotatable body of said rolling container is composed of a main housing and a secondary housing, said main housing capable of being activated by an eccentric rod of a main shaft supporting one of said two stationary side walls of said rolling container so as to rotate in a forward direction or in a rearward direction, said main housing and said secondary housing being engageable with each other by means of a hook located therebetween and of a retaining projection located therebetween such that said main housing rotates in a specified direction so as to trigger said secondary housing to rotate, and that said main housing rotates in reverse so as to cause said main housing and said secondary housing to overlap each other.

5. The automatic device for making a flour strap according to claim 4 wherein said secondary housing is provided at the outer side thereof with a notch in which a cylinder is lodged so as to prevent said secondary housing from turning.

6. The automatic device for making a flour strap according to claim 1 wherein said baffle of said rolling container is mounted rotatably in said rolling container and is provided with a connection rod extending outwards through a slot of one of said two stationary side walls such that said baffle is activated to prevent a flour dough or a flour strap from being carried along with said main housing of said rolling container.

* * * * *